(12) United States Patent  (10) Patent No.: US 7,954,310 B2
Nest  (45) Date of Patent: Jun. 7, 2011

(54) FUEL OIL BI-DIRECTIONAL FLOW DIVIDER

(75) Inventor: John C. Nest, Maitland, FL (US)

(73) Assignee: Siemens Energy, Inc., Orlando, FL (US)

( * ) Notice: Subject to any disclaimer, the term of this patent is extended or adjusted under 35 U.S.C. 154(b) by 1391 days.

(21) Appl. No.: 11/454,699

(22) Filed: Jun. 16, 2006

(65) Prior Publication Data

US 2007/0289308 A1    Dec. 20, 2007

(51) Int. Cl.
*F02C 7/232* (2006.01)

(52) U.S. Cl. .................................. 60/39.094; 60/734

(58) Field of Classification Search ............... 60/39.094, 60/734
See application file for complete search history.

(56) References Cited

U.S. PATENT DOCUMENTS

| | | | |
|---|---|---|---|
| 2,291,578 A | | 7/1942 | Johnson |
| 2,343,912 A | * | 3/1944 | Lauck ............................ 244/226 |
| 2,719,035 A | * | 9/1955 | Neville et al. ..................... 415/10 |
| 2,818,110 A | | 12/1957 | Rulseh |
| 2,949,924 A | * | 8/1960 | Cochran, Jr ..................... 137/99 |
| 3,601,139 A | | 8/1971 | Kontranowski |
| 3,788,435 A | | 1/1974 | Prueter |
| 4,531,535 A | | 7/1985 | Kiernan et al. |
| 4,964,270 A | * | 10/1990 | Taylor et al. ................ 60/39.094 |
| 5,036,939 A | | 8/1991 | Johnson et al. |
| 5,561,976 A | * | 10/1996 | Chu et al. ..................... 60/39.463 |
| 6,209,310 B1 | * | 4/2001 | Kuenzi et al. ..................... 60/775 |
| 6,250,065 B1 | | 6/2001 | Mandai et al. |
| 6,256,975 B1 | | 7/2001 | Döbbeling et al. |
| 6,393,827 B1 | | 5/2002 | Nakamoto |
| 6,438,963 B1 | | 8/2002 | Traver et al. |
| 6,536,217 B2 | | 3/2003 | Lipinski et al. |
| 6,637,184 B2 | | 10/2003 | Freeman |
| 6,675,583 B2 | | 1/2004 | Willis et al. |
| 6,892,544 B2 | | 5/2005 | Futa, Jr. et al. |
| 6,938,425 B2 | | 9/2005 | Simpson et al. |

* cited by examiner

*Primary Examiner* — Michael Cuff
*Assistant Examiner* — Vikansha S Dwivedi

(57) ABSTRACT

A fuel purge system for a combustion turbine engine fuel supply system (32) to remove fuel from the fuel system (32). The system (32) includes a fuel supply line (40, 42, 44) for supplying fuel from a fuel source (38) to a plurality of burner nozzles (41, 43, 45) of the engine (34). A bi-directional flow divider (52a, 52b, 52c) is located in the fuel supply line (40, 42, 44) for receiving fuel from the fuel source (38) on an inlet side of the flow divider (52a, 52b, 52c) and for dividing the fuel to a plurality of fuel output lines (60, 62, 64) connected to the plurality of burner nozzles (41, 43, 45). A purging fluid line (88, 92, 96) is connected to each fuel output line (60, 62, 64) for supplying purging fluid to the fuel supply line (40, 42, 44), and a diverter valve (100, 102, 104) and drain line (106, 108, 110) are connected to the fuel supply line (40, 42, 44) on said inlet side of the flow divider (52a, 52b, 52c) for draining the purging fluid and fuel to a drain system (112).

16 Claims, 4 Drawing Sheets

FUEL OIL BI-DIRECTIONAL FLOW DIVIDER

FIELD OF THE INVENTION

The present invention relates to fuel systems for combustion turbine engines and, more particularly, to a system for purging fuel from a fuel system for a combustion turbine engine.

BACKGROUND OF THE INVENTION

In a combustion turbine engine a fuel, such as fuel oil, is supplied to and ignited in a combustion section. The products of the combustion are directed through a turbine section where their expansion turns a central rotor. In the case of a combustion turbine engine for a power plant, the rotation of the central rotor is used to generate a power output, such as an electrical power output.

In a known "staged" fuel flow or combustion arrangement, a main fuel pump transfers fuel from a fuel supply into several fuel supply lines. Each fuel supply line carries fuel to a different group of nozzles which defines one of a plurality of combustion stages disposed within the engine. The fuel supply lines pass fuel to respective flow dividers that split the fuel flow so that all nozzles associated with a combustion stage receive fuel at a controlled, substantially identical flow rate. Flow dividers for distributing equal amounts of fuel to a plurality of nozzles typically comprise a plurality of spaced sets of metering spur gears for distributing fuel from a common inlet to a plurality of outlets, as is described in U.S. Pat. No. 4,531,535, which is incorporated herein by reference.

If the combustion turbine engine is shut down, such as due to a reduced need for power generation, the fuel lines are typically purged of fuel in order to avoid problems associated with fuel remaining in the lines. For example, purging avoids the possibility of fuel remaining in the supply lines from reaching the nozzles after the fuel flow has been discontinued. Fuel purging may be performed by injecting a purging fluid, such as demineralized water, into the fuel supply lines to purge and drain the fuel away from the nozzles.

FIG. 1 is a schematic diagram illustrating a known fuel purging system in a fuel supply system. Fuel oil is provided from a fuel supply 10 through a throttle valve 12 to a flow divider 14. The flow divider 14 operates in a single, forward direction to provide fuel to one combustion stage in a combustion turbine engine. The flow divider 14 comprises sixteen outlet ports 18 for supplying a metered fuel flow to sixteen output lines 20. A multifunction valve assembly 16 is provided at the outlet of the flow divider 14, and comprises a set of three valves for each output line 20 (only one set labeled) including a block valve 22, a purge valve 24, and a drain valve 26. The drain valve 26 is included in a drain line 28 that is connected to the output line 20 at a location between the block valve 22 and the purge valve 24. A purge fluid supply 30 (only one shown) is connected to the output line 20 downstream from the purge valve 24.

In order to purge the system of fuel, the block valve 22, purge valve 24 and drain valve 26 may be closed to prevent fluid flow in a reverse direction through the valve assembly 16. Purge fluid from the purge fluid supply 30 then flows in the forward direction through the output line 20, to purge fuel from the output line 20 in the direction of a burner nozzle (not shown). Subsequently, the purge valve 24 and drain valve 26 may be opened with the block valve 22 remaining closed, so that the purge fluid and fuel flow in a reverse direction through the output line 20 and through the drain line 28 to a drain 29.

The above-described known fuel purge system incorporates a multifunction valve assembly that requires three valves per output line, or forty-eight valves per flow divider, for performing a fuel purging operation. It is desirable to provide a fuel purging system that effectively operates to purge fuel from a fuel supply system for a combustion turbine engine, and that simplifies the system by reducing the number of valves required for performing fuel purging.

SUMMARY OF THE INVENTION

In accordance with one aspect of the invention, an apparatus is provided for removing fuel from a fuel system for a combustion turbine engine. The apparatus comprises a fuel supply line for supplying fuel from a fuel source to a plurality of burner nozzles of the combustion turbine engine. An ON/OFF valve controls fuel flow through the fuel supply line to an inlet side of a flow divider that divides the fuel to a plurality of fuel output lines connected to a like plurality of burner nozzles. A fuel purging line is connected to each fuel output line for supplying a purging fluid to the fuel output line. A diverter valve and drain line are connected to the fuel supply line on the inlet side of the flow divider for draining purging fluid and fuel to a drain system.

In accordance with another aspect of the invention, an apparatus is provided for removing fuel from a fuel system for a combustion turbine engine. The apparatus comprises a fuel supply line for supplying fuel from a fuel source to a plurality of burner nozzles of the combustion turbine engine. A bi-directional flow divider is located in the fuel supply line, the flow divider includes an inlet side connected to the fuel supply line and an outlet side connected to a plurality of fuel output lines connected to the plurality of burner nozzles. A fuel purging line is connected to each fuel output line for supplying a purging fluid to the fuel output line, and a diverter valve and drain line are connected to the fuel supply line on the inlet side of the flow divider for draining the purging fluid and fuel to a drain system.

In accordance with a further aspect of the invention, an apparatus is provided for removing fuel from a fuel system for a combustion turbine engine. The apparatus comprises a fuel supply line for supplying fuel from a fuel source to a plurality of burner nozzles of a combustion turbine engine. A flow divider is coupled to the fuel supply line for receiving fuel on an inlet side of the flow divider and dividing the fuel to a plurality of fuel output lines connected to the plurality of burner nozzles. A fuel purging line is provided for supplying a purging fluid, and valving structure is located in the fuel supply line to prevent fuel from flowing from the fuel source to the flow divider, so that purging fluid and fuel flow from the fuel output lines through corresponding burner nozzles, and to enable purging fluid and fuel to flow from the fuel output lines through the flow divider to a drain system.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 2:
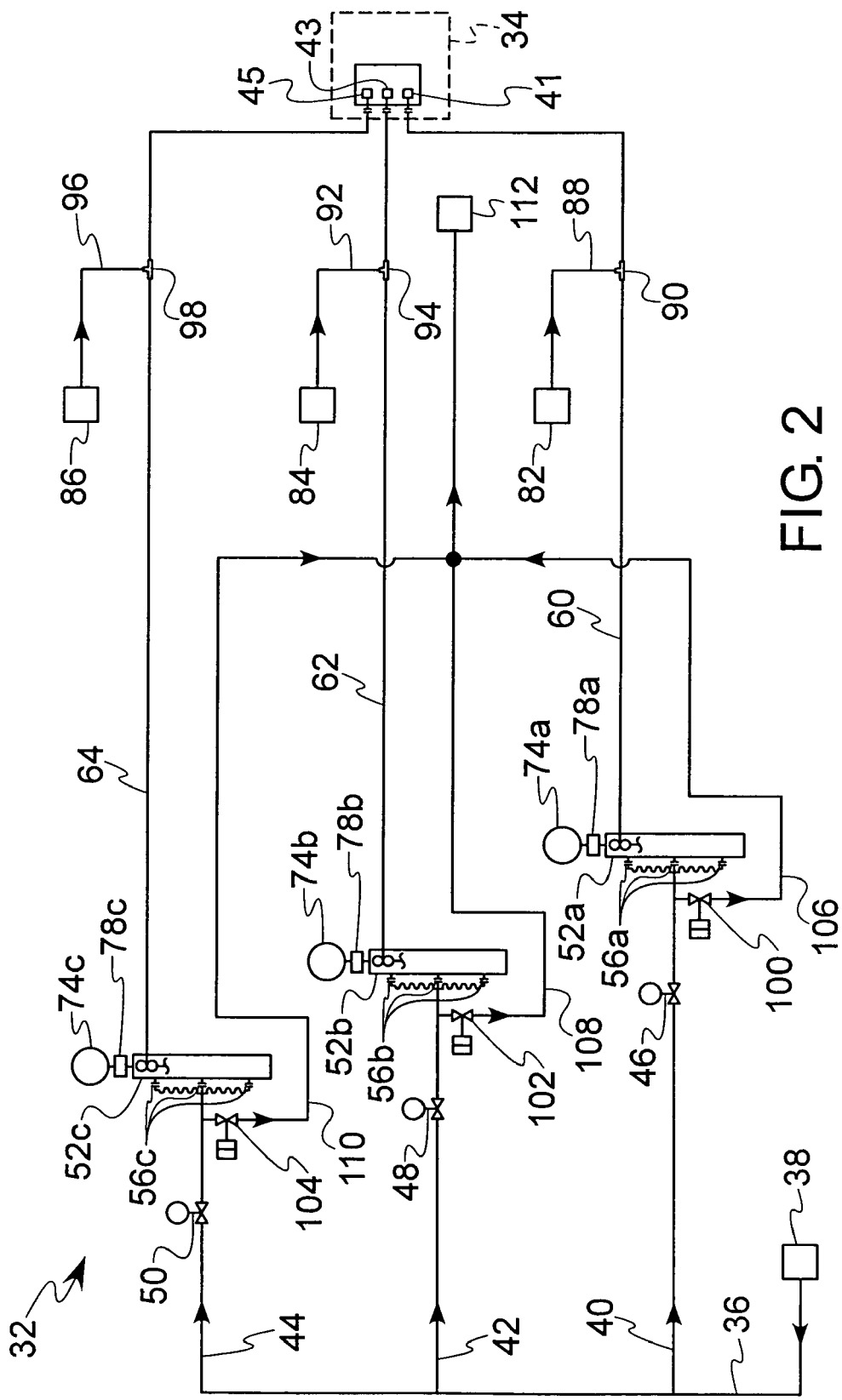
FIG. 2 is a schematic diagram illustrating a fuel purge system in accordance with the present invention.

Referring to FIG. 2, the present invention comprises a fuel purge system provided to a fuel supply system 32 for supplying fuel to three stages of a combustion turbine engine 34. In particular, the system illustrated in FIG. 2 comprises an example of an embodiment for providing fuel to burner nozzles of the combustion turbine engine 34, and including components for carrying out a fuel purge operation for purging fuel from the system. The fuel supply system 32 includes a main fuel supply line 36 for receiving and conveying fuel from a fuel supply 38, such as a source of liquid fuel oil and a pump (not shown) connected to the stored source of liquid fuel oil.

The main fuel supply line 36 branches to separate fuel supply lines 40, 42, 44 associated with corresponding burner nozzle stages of the engine 34. For example, the fuel supply line 40 may be associated with a pilot stage of the burner nozzles 41 (only one nozzle illustrated); the fuel supply line 42 may be associated with another combustion stage "A" of the burner nozzles 43 (only one nozzle illustrated); and, the fuel supply line 44 may be associated with a further combustion stage "B" of the burner nozzles 45 (only one nozzle illustrated). Each of the combustion stages of the burner nozzles may have different fuel flow requirements, and each of the fuel supply lines 40, 42, 44 include a respective throttle valve 46, 48, 50, where each of the throttle valves 46, 48, 50 is individually controlled to provide a predetermined fuel flow to its respective combustion stage, and may also be controlled as an ON/OFF flow control valve to close off flow from the fuel supply line 36.

Figure 1:
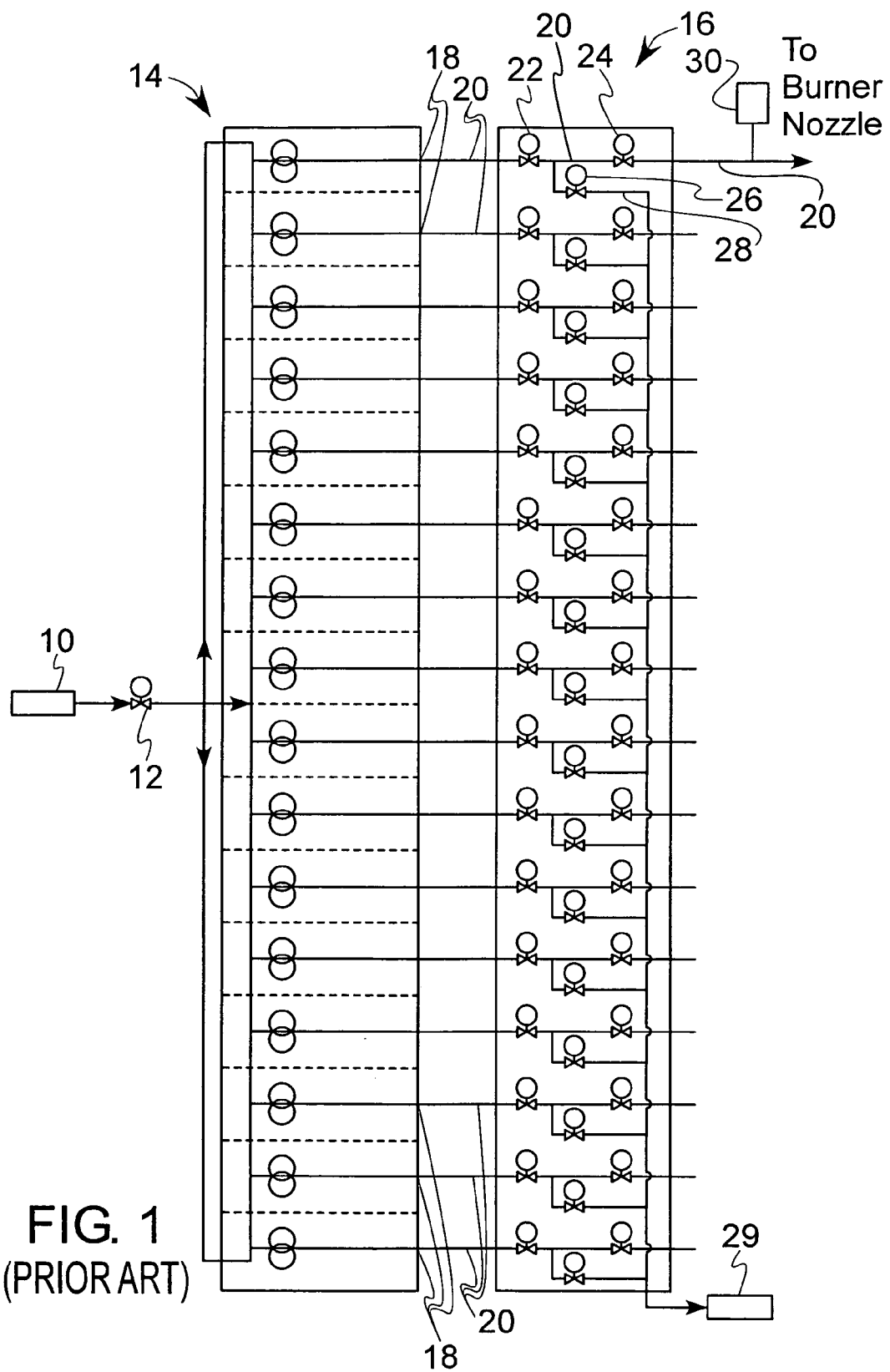
FIG. 1 is a schematic diagram illustrating a prior art fuel purge system incorporated in a fuel supply.

Each of the fuel supply lines 40, 42, 44 conveys fuel to a respective flow divider 52a, 52b, 52c, where each flow divider 52a, 52b, 52c may include three inlet branches 56a, 56b, 56c, respectively, providing fuel to an inlet side of the flow divider 52a, 52b, 52c. Further, an outlet side of each flow divider 52a, 52b, 52c includes a plurality of fuel supply output lines 60, 62, 64, respectively, where only one of the plurality of the output lines 60, 62, 64 for each flow divider 52a, 52b, 52c is shown in FIG. 2. It should be understood that in the illustrated embodiment of the present example, sixteen output lines 60, 62, 64 may be provided on the outlet side of each of the respective flow dividers 52a, 52b, 52c in a manner similar to that illustrated for the flow divider 14 in FIG. 1. That is, each flow divider 52a, 52b, 52c may supply sixteen output lines with each output line providing fuel to one of sixteen nozzles in the engine 34. Alternatively, each flow divider 52a, 52b, 52c may supply less than or more than sixteen output lines providing fuel to a like number of engine nozzles.

Each of the flow dividers 52a, 52b, 52c meters fuel out to each of their respective associated output lines 60, 62, 64 in substantially equal amounts such that the sixteen fuel lines associated with any given flow divider 52a, 52b, 52c receive a substantially equal flow of fuel. Preferably, the variation in fuel flow rate between the plurality of output lines 60, 62, 64 supplied by any given flow divider 52a, 52b, 52c is within a range of approximately 3-5%. The operation of the flow dividers 52a, 52b, 52c will be described below with particular reference to the flow divider 52a, it being understood that each of the other flow dividers 52b and 52c may comprise a substantially similar structure operating in a similar manner.

Figure 3:
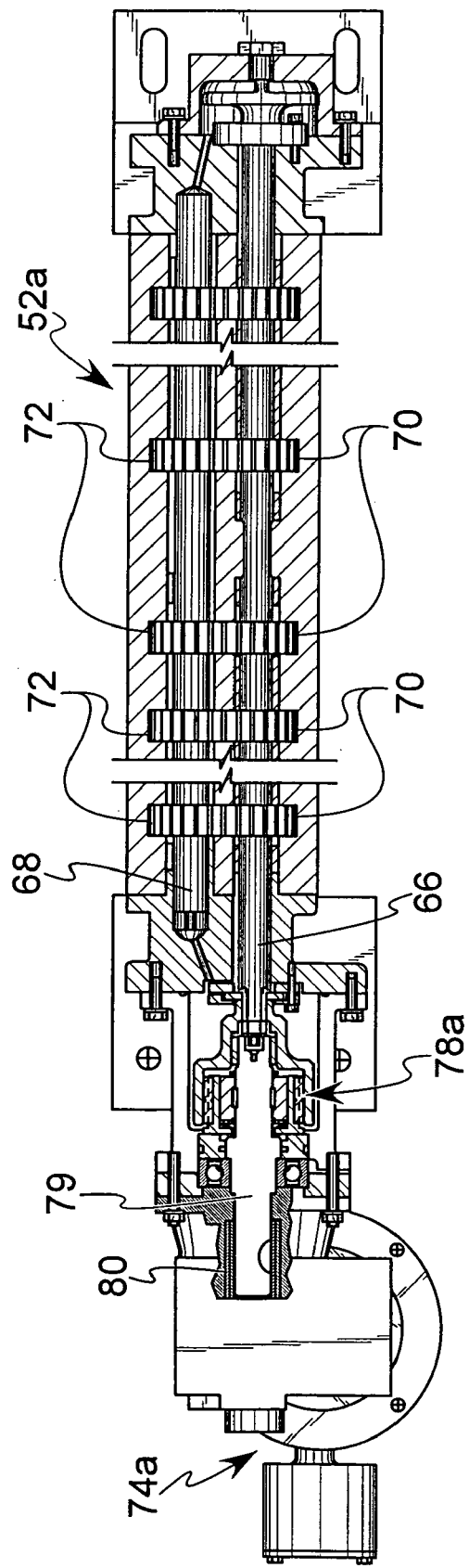
FIG. 3 is partial cross-sectional view of a flow divider connected to a drive motor by a bi-directional clutch.

As may be seen in FIG. 3, the flow divider 52a comprises parallel first and second shafts 66, 68. The first shaft 66 rigidly supports a first plurality of gears 70 for rotation with the first shaft 66, and the second shaft 68 rigidly supports a second plurality of gears 72 for rotation with the second shaft 68. The first and second plurality of gears 70, 72 are located in engagement with each other to form sets of meshing gears 70, 72, where each set of meshing gears 70, 72 functions to meter fuel to a respective one of the plurality of output lines 60 associated with the flow divider 52a. The operation of flow dividers is well known in the art, and the flow divider 52a may operate in a manner generally similar to that described in the above-referenced U.S. Pat. No. 4,531,535.

In accordance with an aspect of the present invention, each of the flow dividers 52a, 52b, 52c is provided with a respective starting motor 74a, 74b, 74c (FIG. 2). The starting motors 74a 74b, 74c may each comprise a reversible motor, such as a ½ horsepower reversible motor. Referring to FIG. 3, the starting motor 74a is provided for driving the first shaft 66 of the flow divider 52a in forward and reverse directions through a bi-directional overrunning clutch 78a. As discussed below, the clutch 78a disengages the first shaft 66 of the flow divider 52a from the driving force of an output shaft 80 of the motor 74a when the first shaft 66 rotates faster that the output shaft 80 when rotating in either direction.

During a flow operation for supplying fuel to the nozzles 41 of the engine 34, the output shaft 80 of the motor 74a provides an initial driving force for rotating the first shaft 66 in the forward direction. The driving force from the motor 74a may be provided for a predetermined time, such as for example 30 seconds, at the beginning of rotation of the shafts 66, 68 to overcome any drag in the gear sets of the flow divider 52a as flow in the fuel supply line 40 is initiated. Subsequently, the motor 74a may be turned off and the rotation of the shafts 66, 68 may be sustained solely by hydrodynamic forces of the fuel flow through the flow divider 52a. The bi-directional clutch 78a may disengage the output shaft 80 of the motor 74a from the first shaft 66 when the rotational velocity of the first shaft 66 exceeds the rotational velocity of the output shaft 80 of the motor 74a.

During a fuel purge operation where liquid may be conveyed through the output lines 60 in a reverse direction, the motor 74a may be reversed such that the output shaft 80 of the motor 74a provides a reverse driving force to the first shaft 66. The driving force from the motor 74a in the reverse direction may be provided for a predetermined time, such as for 30 seconds, to overcome any initial drag in the gear sets at the beginning of flow through the flow divider 52a in the reverse direction. Subsequently, the motor 74a may be turned off and the reverse rotation of the shafts 66, 68 may be sustained solely by hydrodynamic forces of the reverse flow through the flow divider 52a.

Figure 4:
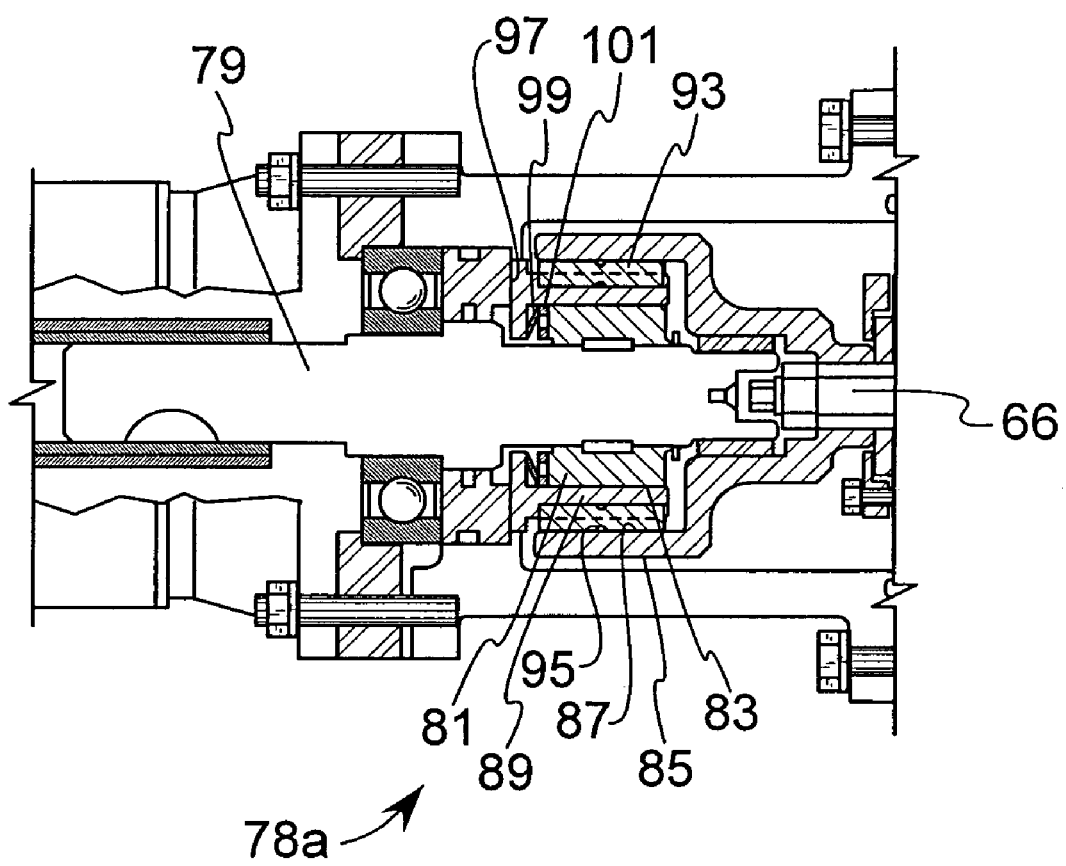
FIG. 4 is a partial cross-sectional view of the bi-directional clutch.

Referring to FIG. 4, the bi-directional clutch 78a operates in a manner generally similar to known bi-directional overrunning clutches such as are disclosed, for example, in U.S. Pat. Nos. 3,788,435 and 5,036,939, which patents are incorporated herein by reference. The clutch 78a includes an inner member 81 attached for rotation with the output shaft 80 via a clutch input shaft 79. The inner member 81 may include a polygonal outer surface 83 defining a set of ramps or cam areas. A cylindrical outer member 85 is located coaxial with the inner member 81 and includes an inner surface 87 facing the outer surface 83 of the inner member 81. The outer member 85 is attached for rotation with the first shaft 66 of the flow divider 52a. Between the outer surface 83 and the inner surface 87 is an annular roller cage 89 carrying a set of rollers 93 which are biased radially inwardly by a circumferential spring 95 to engage the respective cam areas of the outer surface 83. The roller cage 89 is urged into light frictional contact with a stationary surface 97 by a wave spring 99 cooperating with a thrust bearing 101.

When the clutch input shaft 79 is driven in either direction, the roller cage 89 will initially be held substantially stationary by the light frictional contact at stationary surface 97, and the rollers 93 will move relative to the respective cam areas on the outer surface 83, causing the roller 93 to move radially outwardly into wedging engagement between the outer and inner surfaces 83, 87 to drive the outer member 85 and first shaft 66 in rotation. When the first shaft 66 rotates faster than the rotational speed of the clutch input shaft 79 in either direction, the rollers 93 will move along the cam areas of the outer surface 83 to disengage from wedging engagement to permit the first shaft 66 to overrun the input shaft 79.

Referring to FIG. 2, the system 32 further includes a source 82, 84, 86 of purging fluid connected to each of the respective output lines 60, 62, 64 at a downstream location on the output lines generally near to the nozzles 41, 43, 45 for the engine 34. Specifically, each source of purging fluid 82 may be connected to its corresponding output line 60 via corresponding purging fluid lines 88 (only one shown) and T-connections 90 (only one shown); each source of purging fluid 84 may be connected to its corresponding output line 62 via corresponding purging fluid lines 92 (only one shown) and T-connections 94 (only one shown); and, each source of purging fluid 86 may be connected to its corresponding output line 64 via corresponding purging fluid lines 96 (only one shown) and T-connections 98 (only one shown). Each of the purging fluid sources 82, 84, 86 preferably comprises a supply of demineralized water and a pump (not shown) for providing the demineralized water as a purging fluid under pressure to the output lines 60, 62, 64.

The supply lines 40, 42, 44, include respective diverter valves 100,102, 104 located generally near the inlet sides of the flow dividers 52a, 52b, 52c. The diverter valves 100, 102, 104 are provided to control a flow path to respective drain lines 106, 108, 110 connected to a fuel drain system 112.

In an operation of the described system 32 to purge fuel oil from the system, an operation of conveying fuel in the forward direction through the fuel lines 40, 42, 44 may be stopped at a time corresponding to stopping operation of the engine 34 by closing the throttle valves 46, 48, 50. Subsequently, the purging fluid sources 82, 84, 86 may be actuated to convey purging fluid, e.g., demineralized water, to the output lines 60, 62, 64. The diverter valves 100, 102, 104 are initially closed and the purging fluid and fuel is initially caused to flow through the output lines 60, 62, 64 in the forward direction toward the nozzles 41, 43, 45 to drain the purging fluid and fuel out through the nozzles 41, 43, 45. Subsequently, the diverter valves 100, 102, 104 are opened, while maintaining the throttle valves 46, 48, 50 closed, to permit flow of the purging fluid and fuel in the reverse direction, i.e., from the T-connections 90, 94, 98 toward the respective flow dividers 52a, 52b, 52c.

At the beginning of the reverse flow through the output lines 60, 62, 64, the flow dividers 52a, 52b, 52c are actuated to rotate in the reverse direction by the motors 74a, 74b, 74c. At this time, the bi-directional clutches 78a, 78b, 78c operate to rotatably connect the motor driven output shafts 80 with the first shafts 66 of the flow dividers 52a, 52b, 52c in the reverse direction. When the speed of the first shafts 66 of the flow dividers 52a, 52b, 52c exceeds the speed of the motor output shafts 80, hydrodynamic pressure may maintain the continued movement of the flow dividers 52a, 52b, 52c in the reverse direction. The motors 74a, 74b, 74c may provide a drive in the reverse direction for a predetermined period of time, such as 30 seconds. During the reverse flow, the purging fluid and fuel is drained out through the fuel drain lines 106, 108, 110 to the fuel drain system 112.

After a predetermined time of reverse flow, the diverter valves 100, 102, 104 will again be closed and the purging fluid and fuel remaining in the output lines 60, 62, 64 will again be conveyed in the forward direction to further empty the output lines 60, 62, 64 of fuel in the direction of the nozzles 41, 43, 45. The diverter valves 100, 102, 104 are then reopened and the flow dividers 52a, 52b, 52c are driven in the reverse direction to again drain the output lines 60, 62, 64 in the reverse direction. This forward/reverse cycling of the purging fluid through the output lines 60, 62, 64 is preferably repeated three times in order to replace any remaining fuel between the diverter valves 100, 102, 104 and the nozzles 41, 43, 45 with the purging fluid, i.e., to fill the lines 60, 62, 64 between the diverter valves 100, 102, 104 and the nozzles 41, 43, 45 with, for example, demineralized water.

The purging process operates to cool the fuel lines in the area of the engine 34 near the nozzles 41, 43, 45, and further displaces fuel from the output lines that otherwise may possibly leak out of the nozzles at a later time. In addition, the purging fluid in the output lines 60, 62, 64 following the purging process provides a volume of purging fluid that may later provide cooling to the nozzles 41, 43, 45, such as at a later start up operation of the engine 34 or possibly during a fuel transfer operation, e.g., to transfer operation from a liquid fuel oil to a gas fuel, during operation of the engine 34.

The above-described flow dividers 52a, 52b, 52c and clutches 78a, 78b, 78c associated with the motors 74a, 74b, 74c are preferably formed of materials that are resistant to the corrosive effects of the purging fluid, such as demineralized water, as the purging fluid is conveyed in the reverse direction through the flow dividers 52a, 52b, 52c. For example, stainless steel may be incorporated in the construction of the flow dividers 52a, 52b, 52c and clutches 78a, 78b, 78c.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for removing fuel from a fuel system for a combustion turbine engine, the apparatus comprising:

a fuel supply line for supplying fuel from a fuel source to a plurality of burner nozzles of a combustion turbine engine;

an ON/OFF valve provided in said fuel supply line;

a flow divider providing a flow in a forward and reverse direction and located in said fuel supply line for receiving fuel from said fuel source on an inlet side of said flow divider and dividing said fuel to a plurality of fuel output lines connected to said plurality of burner nozzles for delivering fuel to said nozzles during said flow through said flow divider in said forward direction;

a fuel purging line connected to each fuel output line for supplying a purging fluid to said fuel supply line; and a diverter valve and drain line connected to said fuel supply line on said inlet side of said flow divider for conveying and draining said purging fluid and fuel from said output lines to a drain system during said flow through said flow divider in said reverse direction.

2. The apparatus of claim 1, wherein said flow divider comprises a plurality of meshing gears for metering fuel to said fuel output lines.

3. The apparatus of claim 2, including a motor including an output shaft connected to said flow divider for causing said gears of said flow divider to rotate for conveying fluid though said flow divider.

4. The apparatus of claim 3, including a bi-directional clutch connecting said output shaft of said motor to said flow divider.

5. The apparatus of claim 4, wherein said bi-directional clutch disengages said motor from said flow divider when hydrodynamic pressure on fluid passing through said flow divider causes said flow divider to be driven faster than said output shaft of said motor.

6. The apparatus of claim 1, including a plurality of flow dividers, each said flow divider supplying fuel from said fuel source to a plurality of fuel output lines, where each flow divider supplies fuel for a combustion stage in said combustion turbine engine.

7. An apparatus for removing fuel from a fuel system for a combustion turbine engine, the apparatus comprising:
   a fuel supply line for supplying fuel from a fuel source to a plurality of burner nozzles of a combustion turbine engine;
   a bi-directional flow divider located in said fuel supply line, said flow divider including an inlet side connected to said fuel supply line and an outlet side connected to a plurality of fuel output lines connected to said plurality of burner nozzles;
   a fuel purging line connected to each fuel output line for supplying a purging fluid to said fuel supply line;
   a diverter valve and drain line connected to said fuel supply line on said inlet side of said flow divider for draining said purging fluid and fuel to a drain system; and
   wherein said flow divider is rotatable in a forward and reverse direction, where fuel is conveyed to said burner nozzles through said output lines during rotation in said forward direction during operation of said turbine engine, and said purging fluid and fuel is conveyed from said output lines to said drain line during rotation in said reverse direction during a purging operation.

8. The apparatus of claim 7, including a reversible motor including an output shaft connected to said flow divider for providing a forward and reverse drive to said flow divider.

9. The apparatus of claim 8, including a bi-directional clutch connecting said output shaft of said motor to said flow divider.

10. The apparatus of claim 9, wherein said bi-directional clutch disengages said motor from said flow divider when hydrodynamic pressure on fluid passing through said flow divider causes said flow divider to be driven faster than an output shaft of said motor.

11. The apparatus of claim 7, wherein said flow divider comprises a plurality of meshing gears for metering fuel to said fuel output lines.

12. The apparatus of claim 7, including a plurality of flow dividers, each said flow divider supplying fuel from said fuel source to a plurality of fuel output lines, where each flow divider supplies fuel for a combustion stage in said combustion turbine engine.

13. An apparatus for removing fuel from a fuel system for a combustion turbine engine comprising:
   a fuel supply line for supplying fuel from a fuel source to a plurality of burner nozzles of a combustion turbine engine;
   a bi-directional flow divider coupled to said fuel supply line for receiving fuel from said fuel supply line on an inlet side of said flow divider and dividing said fuel to a plurality of fuel output lines connected to said plurality of burner nozzles;
   a fuel purging line for supplying a purging fluid;
   valving structure located in said fuel supply line to prevent fuel from flowing from said fuel source to said flow divider, to enable purging fluid and fuel to flow from said fuel output lines through corresponding burner nozzles, and to enable purging fluid and fuel to flow from said fuel output lines through said flow divider to a drain system; and
   a reversible motor coupled to said flow divider by an overrunning bi-directional clutch for providing a forward and reverse drive to said flow divider.

14. The apparatus of claim 13, wherein said valving structure is located adjacent said inlet side of said flow divider.

15. The apparatus of claim 14, wherein said valving structure comprises an ON/OFF valve for preventing fuel from flowing from said fuel source to said flow divider.

16. The apparatus of claim 15, wherein said valving structure comprises a diverter valve located between said ON/OFF valve and said flow divider for controlling flow of purging fluid and fuel to said drain system.

\* \* \* \* \*